United States Patent
Khajehoddin et al.

(10) Patent No.: US 8,612,058 B2
(45) Date of Patent: Dec. 17, 2013

(54) MAXIMUM POWER POINT TRACKING FOR A POWER GENERATOR

(75) Inventors: Sayed Ali Khajehoddin, Kingston (CA); Praveen K. Jain, Kingston (CA); Alireza Bakhshai, Kingston (CA)

(73) Assignee: SPARQ Systems Inc., Kingston, ON (CA)

( * ) Notice: Subject to any disclaimer, the term of this patent is extended or adjusted under 35 U.S.C. 154(b) by 276 days.

(21) Appl. No.: 13/094,207

(22) Filed: Apr. 26, 2011

(65) Prior Publication Data

US 2011/0264288 A1   Oct. 27, 2011

Related U.S. Application Data

(60) Provisional application No. 61/327,782, filed on Apr. 26, 2010.

(51) Int. Cl.
    *G05D 27/00*   (2006.01)
(52) U.S. Cl.
    USPC ............................. 700/287; 700/298; 700/297
(58) Field of Classification Search
    None
    See application file for complete search history.

(56) References Cited

U.S. PATENT DOCUMENTS

| | | | | |
|---|---|---|---|---|
| 4,375,662 | A * | 3/1983 | Baker | 363/95 |
| 5,869,956 | A * | 2/1999 | Nagao et al. | 323/299 |
| 6,057,665 | A * | 5/2000 | Herniter et al. | 320/101 |
| 6,255,804 | B1 * | 7/2001 | Herniter et al. | 320/137 |
| 7,193,872 | B2 * | 3/2007 | Siri | 363/95 |
| 7,626,834 | B2 | 12/2009 | Chisenga et al. | |
| 7,714,550 | B2 * | 5/2010 | Houk et al. | 323/272 |
| 8,344,547 | B2 * | 1/2013 | Fife et al. | 307/75 |
| 2008/0036440 | A1 * | 2/2008 | Garmer | 323/299 |
| 2009/0316447 | A1 | 12/2009 | Kim et al. | |
| 2010/0117623 | A1 * | 5/2010 | Fife et al. | 324/76.11 |
| 2010/0208501 | A1 * | 8/2010 | Matan et al. | 363/95 |
| 2010/0236612 | A1 | 9/2010 | Khajehoddin et al. | |
| 2010/0301797 | A1 * | 12/2010 | Schultz | 320/101 |
| 2011/0130889 | A1 | 6/2011 | Khajehoddin et al. | |
| 2011/0261593 | A1 | 10/2011 | Pan et al. | |
| 2012/0310436 | A1 * | 12/2012 | Kjaer | 700/297 |
| 2013/0020873 | A1 * | 1/2013 | Barlock et al. | 307/65 |

OTHER PUBLICATIONS

V. Salas, E. Olias, A. Barrado, A. Lázaro, Review of the maximum power point tracking algorithms for stand-alone photovoltaic systems, Solar Energy Materials and Solar Cells, vol. 90, Issue 11, Jul. 6, 2006, pp. 1555-1578.*

(Continued)

*Primary Examiner* — Kavita Padmanabhan
*Assistant Examiner* — Christopher E Everett
(74) *Attorney, Agent, or Firm* — Stephen J. Scribner

(57) ABSTRACT

A maximum power point tracking method and system for use with a power generator comprises sampling instantaneous output voltage and current of the power generator at a first instant in time and at a second instant in time to obtain first and second power samples, generating a reference voltage or current signal from a difference of the first and second power samples; comparing the reference voltage or current to the instantaneous power generator voltage or current and generating at least one gating signal; and repeating so as to minimize the difference of the first and second power samples; wherein the gating signal affects magnitude of the output voltage and current of the power generator; wherein the maximum power point is tracked when the difference signal is minimized. The power generator may be at least one photovoltaic cell, wind turbine, or fuel cell.

18 Claims, 8 Drawing Sheets

(56) References Cited

OTHER PUBLICATIONS

Esram, T.; Chapman, P.L., "Comparison of Photovoltaic Array Maximum Power Point Tracking Techniques," Energy Conversion, IEEE Transactions on , vol. 22, No. 2, pp. 439,449, Jun. 2007.*

Liu, X.; Lopes, L. A C, "An improved perturbation and observation maximum power point tracking algorithm for PV arrays," Power Electronics Specialists Conference, 2004. PESC 04. 2004 IEEE 35th Annual , vol. 3, No., pp. 2005,2010 vol. 3, Jun. 20-25, 2004.*

International Search Report for International Application No. PCT/CA2011/000476 filed on Apr. 26, 2011.

Written Opinion for International Application No. PCT/CA2011/000476 filed on Apr. 26, 2011.

Dolara, A., et al. Energy Comparison of Seven MPPT Techniques for PV Systems, J. Electromagnetic Analysis & Applications 2009, 3:152-162.

Hohm, D.P., et al., Comparative Study of Maximum Power Point Tracking Algorithms., Progress in Photovoltaics: Research and Applications 2003; 11:47-62.

Salhi, M., et al., Maximum Power Point Tracking Controller for PV Systems using a PI Regulator with Boost DC/DC Converter ICGST-ACSE Journal., 2009 8(3): 21-27.

Esram, T., et al., Comparison of photovoltaic array maximum power point tracking techniques, IEEE Transactions on Energy Conversion, 2007; 22:2 439-449.

Shimizu, T., et al., A flyback-type single phase utility interactive inverter with low-frequency ripple current reduction on the DC input for an AC photovoltaic module system, Power Electronics Specialists Conference, 2002. pesc 02. 2002 IEEE 33rd Annual vol. 3 1483-1488.

Shinjo, F., et al., A Single-Phase Grid-Connected Inverter with a Power Decoupling Function, Power Electronics Specialists Conference, 2007. PESC 2007. IEEE 1245-1249.

Hirao, T., at al., A Modified Modulation Control of a Single-Phase Inverter with Enhanced Power Decoupling for a Photovoltaic AC Module, Power Electronics and Applications, 2005 European Conference, 2005.

* cited by examiner (a) $AVG(V_{pv}) > V_{mpp}$ (b) $AVG(V_{pv}) > V_{mpp}$ (close to MPP)

MAXIMUM POWER POINT TRACKING FOR A POWER GENERATOR

RELATED APPLICATION

This application claims the benefit of the filing date of U.S. Provisional Patent Application No. 61/327,782, filed on 26 Apr. 2010, the contents of which are incorporated herein by reference in their entirety.

FIELD

This invention relates to circuits, systems, and methods for obtaining power from a power generator. In particular, the circuits, systems, and methods described herein may be used to maximize the power obtained from the power generator.

BACKGROUND

Grid-connected power generation systems typically include two major parts: power generators that produce the power and inverters that receive, condition, and inject the power into the power distribution grid. Power generators include, for example, photovoltaic (PV) cells and wind turbines.

Power generators may be configured as: centralized, string, multi-string, and AC-module/cell technologies. To increase the overall efficiency of power generators under different conditions, such as varying wind conditions on wind turbines, partial shadowing of PV cells, or mismatches between PV cells, independent control and power extraction is required for each power generator. This requires using a separate inverter, i.e., a micro-inverter", for each power generator. Power extraction from each power generator may enhanced if maximum power point tracking (MPPT) is be performed on each power generator independently.

Maximum power point tracking of a PV cell in particular is challenging due to the nonlinear current-voltage characteristic and ever-changing nature of the irradiation source. Conventional MPPT systems use an algorithm that finds the best operating point and creates a reference signal, or logical and relational operators, and are based on trial and error or seek and find to find the best operating point. These may be implemented in software running on microprocessors. Such approaches may lead to oscillation around the optimum point, which adversely impacts overall efficiency of the system. Moreover, trial and error approaches degrades efficiency for fast changing conditions. This drawback and the low speed characteristic of such approaches may be problematic in conditions such as monotonic and fast increase of the irradiation level.

SUMMARY

Described herein is a maximum power point tracking method, comprising: (i) sampling instantaneous output voltage and current of a power generator at a first instant in time and at a second instant in time to obtain first and second power samples, wherein the instantaneous voltage and current at the first instant in time are always greater than the instantaneous voltage and current at the second instant in time, or vice versa; (ii) generating a reference voltage or current signal from a difference of the first and second power samples; (iii) comparing the reference voltage or current to the instantaneous power generator voltage or current and generating at least one gating signal; and (iv) repeating (i) to (iii) so as to minimize the difference of the first and second power samples; wherein the gating signal affects magnitude of the output voltage and current of the power generator; wherein the maximum power point is tracked when the difference signal is minimized. In one embodiment, generating a reference voltage or current signal from a difference of the first and second power samples may include using a proportional-integral (PI) controller.

The method may include sweeping the output voltage of the power generator for a range of maximum power points, determining a global maximum power point, and setting a starting point for maximum power point tracking as close as possible to the global maximum power point.

Also described herein is a maximum power point tracker, comprising: (i) a sampling means that samples instantaneous output voltage and current of a power generator at a first instant in time and at a second instant in time to obtain first and second power samples, wherein the instantaneous voltage and current at the first instant in time are always greater than the instantaneous voltage and current at the second instant in time, or vice versa; (ii) a subtractor that subtracts the first and second power samples to produce a difference signal; (iii) a means that generates a reference voltage or current signal from the difference signal; and (iv) a means that generates at least one gating signal by comparing the reference voltage or current signal to the instantaneous power generator voltage or current; wherein the gating signal minimizes the difference of the first and second power samples; wherein the maximum power point is tracked when the difference signal is minimized. In one embodiment, the means that generates the reference voltage or current signal may comprise a proportional-integral (PI) controller.

In one embodiment a maximum power point tracker comprises means that sweeps the output voltage of the power generator for a range of maximum power points, determines a global maximum power point, and sets a starting point for maximum power point tracking as close as possible to the global maximum power point.

Also described herein is a micro-inverter for a power generator, comprising a maximum power point tracker as described above and a power converter. The power converter may comprise a DC-DC converter and a DC-AC inverter. The power converter may generate a sinusoidal output current from the power generator output.

Also described herein is a power generation system, comprising a micro-inverter as described above and at least one power generator.

In the methods, circuits, and systems described herein, the power generator may be a photovoltaic cell, a wind turbine, or a fuel cell.

BRIEF DESCRIPTION OF THE DRAWINGS

For a better understanding of the invention, and to show more clearly how it may be carried into effect, embodiments will now be described, by way of example, with reference to the accompanying drawings, wherein.

DETAILED DESCRIPTION OF EMBODIMENTS

Described herein are systems, circuits, and methods for obtaining power from a power generator. A power generator may be, for example, a wind turbine, a fuel cell, or a photovoltaic cell. The power generator may be a distributed power generator. Whereas embodiments of the systems, circuits, and methods are described herein primarily with respect to photovoltaic cells, it will be appreciated that the systems, circuits, and methods are not limited thereto.

Figure 1A:
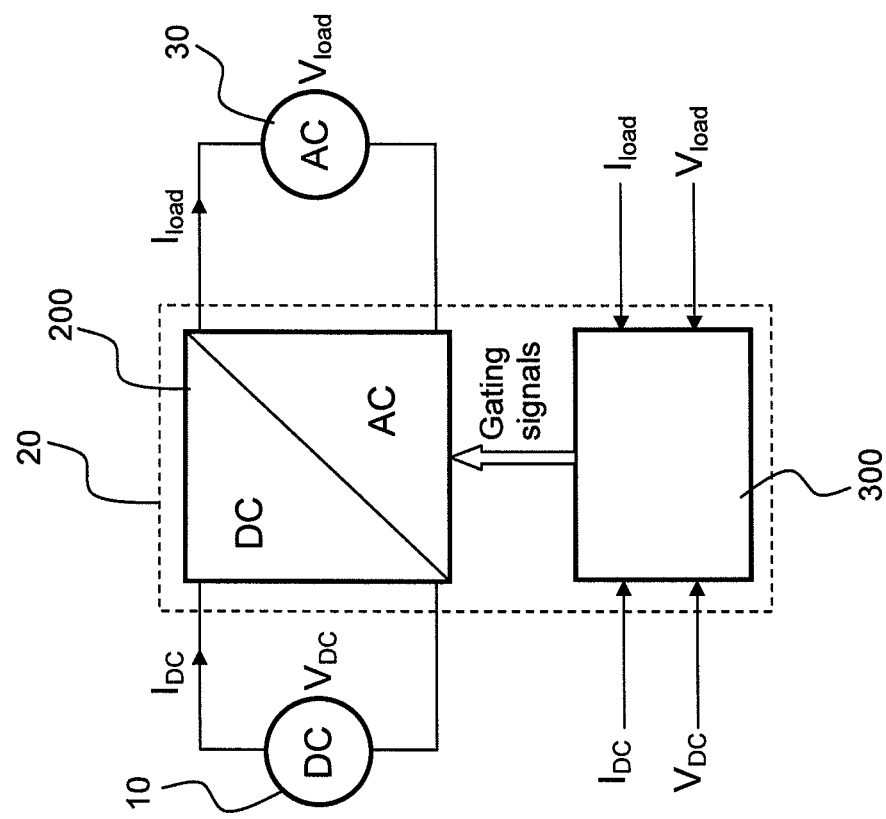
FIGS. 1(a) and (b) are generalized block diagrams of micro-inverter systems.

The systems, circuits, and methods described herein may be used in a micro-inverter for a power generator. As used herein, the term "micro-inverter" refers to a device that interfaces a power generator with a load, such as a power distribution grid. A system including a micro-inverter is shown in the generalized block diagram of FIG. 1(a). The micro-inverter 20 receives power from a power generator 10, and outputs power to a load 30. The micro-inverter 20 may include a power section 200 that may perform one or more functions, such as, for example, DC-DC conversion, DC to AC conversion, or a combination thereof. The micro-inverter may include a control section 300 that may perform one or more functions such as, for example, maximum power point tracking of the power generator, and/or providing gating signals to the power section 200. The gating signals may be determined by sensing the power generator voltage and/or current, and/or the load voltage and/or current.

Figure 1B:
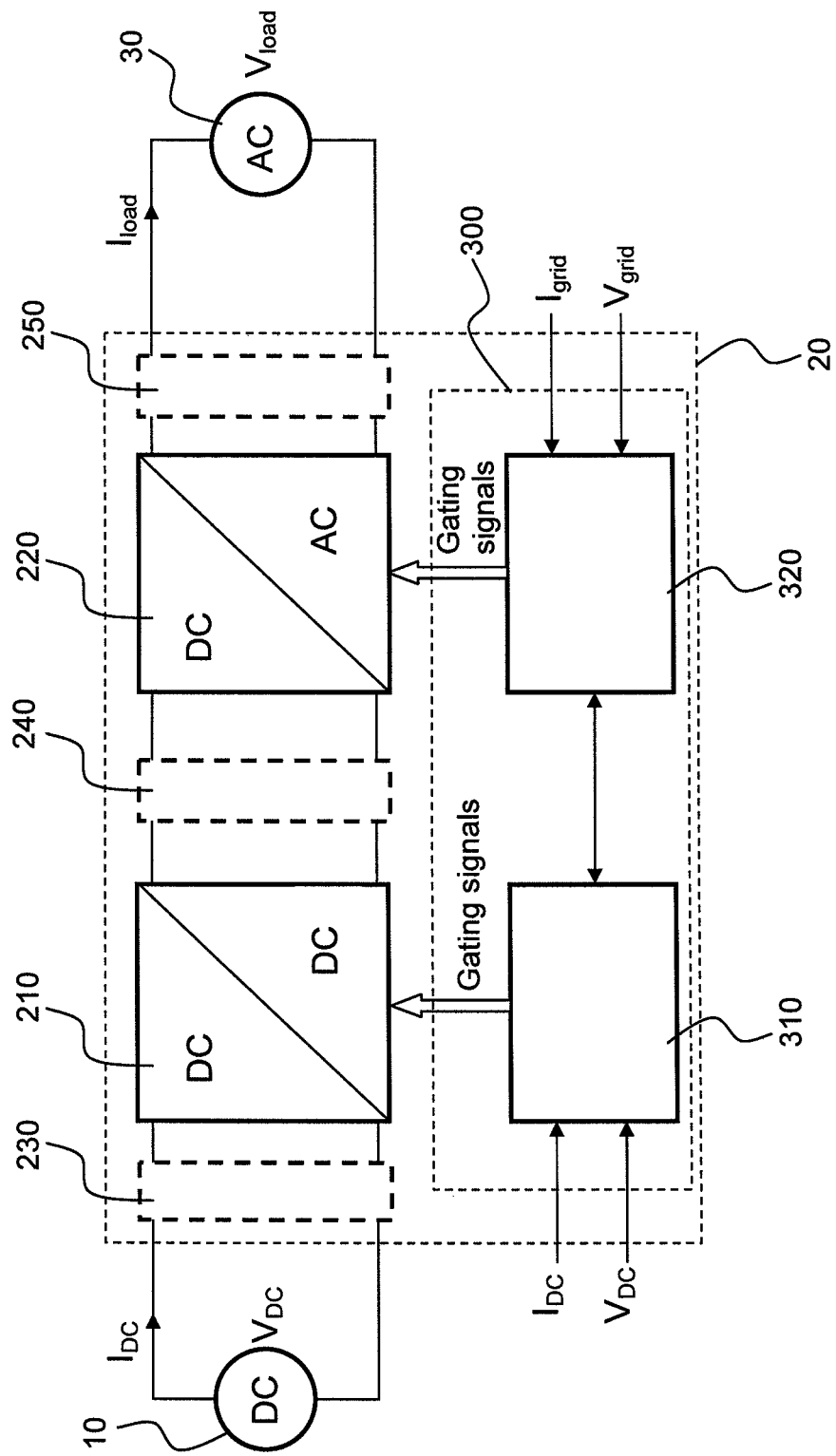

The generalized block diagram of FIG. 1(b) shows an embodiment of a micro-inverter that includes a power converter section 210 (e.g., DC-DC converter) that receives power from the power generator 10, and an inverter section 220 that receives power from the converter section 210 and produces output power. The output power may optionally be conditioned (e.g. filtered) 250 to be compatible with the load 30 (e.g., a power distribution grid). One or more passive component (e.g., a capacitor and/or an inductor) may optionally be employed at the power converter section 210 input and/or between the power converter section 210 and the inverter section 220 (i.e., at 230 and 240, respectively). A filter 250 may optionally be employed at the inverter section 220 output. A first controller 310 may sense the power generator voltage and/or current and produce gating signals for switches of the power converter section 210. The first controller may perform maximum power point tracking. A second controller 320 may sense the voltage and/or current delivered to the load and produce gating signals for switches of the inverter section 220.

A micro-inverter as described herein increases the overall efficiency of the power generator under different circumstances and conditions. For example, in the case of a PV cell or a PV cell string that forms a PV module, partial shadowing of the PV cell or mismatches between PV cells can degrade the overall efficiency of the system. However, use of a micro-inverter for each PV cell, or for each PV cell string or module, permits independent control and power extraction from each PV cell or PV cell string or module, maximizing efficiency of the system despite varying conditions of individual PV cells, strings, or modules.

A micro-inverter as described herein is compact, so as to be attached to a power generator (e.g., to the back of a PV cell). Since micro-inverters are exposed to a wide range of environmental conditions, such as extremes of temperature and humidity, reliability and maintenance are major issues. This exposure also adversely affects the life expectancy and performance of the inverter. These factors demand robust design and construction, and may require more expensive components that lead to a higher manufacturing cost. Consequently, challenges in the design of a micro-inverter are achieving compactness and low cost, e.g., by reducing the number and size of circuit components. Advantageously, a micro-inverter as described herein does not require costly high voltage components and wiring. The controller system may be implemented in whole or in part using discrete components, using digital technology (e.g., in a digital signal processor (DSP), field programmable gate array (FPGA), or application specific integrated circuit (ASIC) device), or using a combination thereof. For example, one or more components of the controller may be implemented in an algorithm using a suitable hardware language such as, for example, very high speed integrated circuit (VHSIC) hardware descriptive language (VHDL), register transfer language (RTL), or Verilog. Such an algorithm may be implemented in, for example, a FPGA or ASIC device, or other suitable logic device. Use of digital technology provides a controller that is compact and robust.

Figures 2A, 2B:
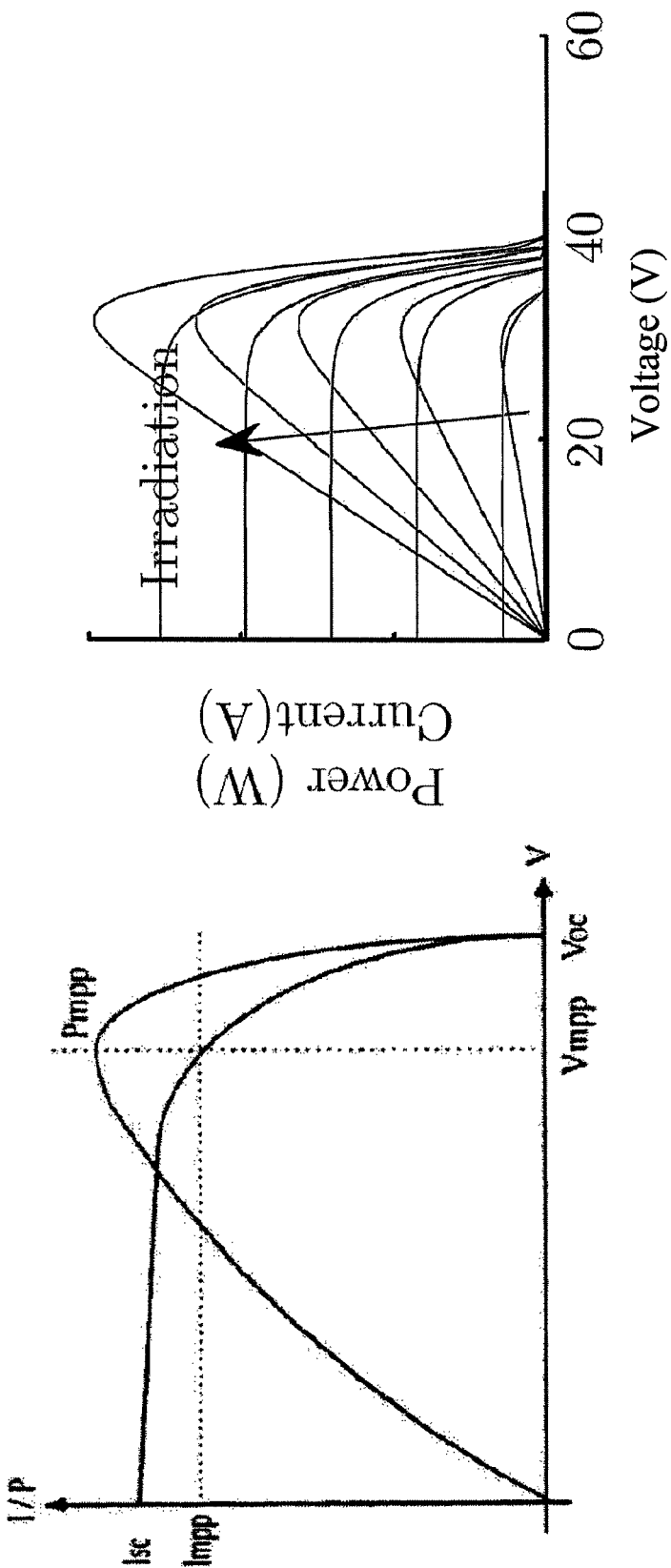
FIG. 2(a) is a plot showing typical current-voltage and power-voltage characteristics and the maximum power point of a PV cell.
FIG. 2(b) is a plot showing how the characteristics change with amount of irradiation.

A micro-inverter as described herein may include maximum power point tracking (MPPT). As a result, MPPT may be performed on each power generator independently. A challenge in using PV cells is presented by their nonlinear current-voltage (I-V) characteristics, which result in a unique maximum power point (MPP) on the power-voltage (P-V) curve, as shown in FIGS. 2(a) and (b). Thus, in the case of PV cells, where partial shading cannot be avoided, MPPT allows the maximum power to be extracted from each PV cell for any instantaneous condition. MPPT removes any mismatch losses between PV cells in the system. Further, micro-inverters as described herein provide modularity to distributed power generators, allowing a "plug and play" approach to their use in a distributed power generation system.

As used herein, the terms "maximum power point tracking (MPPT)" and "maximum power point tracker (MPP tracker)" are distinct. "MPPT" refers to an algorithm and "MPP tracker" refers to hardware (i.e., a circuit). The MPPT calculates the optimum operating point for a power generator, and provides a reference point for MPP tracker to steer the system toward the optimum operating point.

As used herein, the term "photovoltaic cell" refers to any cell having a light absorbing material to absorb photons and generate electrons via a photoelectric effect. A non-limiting example of a photovoltaic cell is a solar cell. The light absorbing material may absorb light in any wavelength or combination of wavelengths, including, for example, wavelengths of solar light that reach the earth's surface, and/or wavelengths of solar light beyond the earth's atmosphere. Two or more light absorbing materials having specific wavelengths of light absorption may be used in combination to take advantage of different light absorption and charge separation mechanisms. The light absorbing material may be configured as, for example, bulk material, thin-film (e.g., inorganic layers, organic dyes, and organic polymers), and/or nanocrystals. The photovoltaic cells may be combined into arrays, strings, modules, or panels.

As used herein, the term "photovoltaic cell string" refers to a plurality of photovoltaic cells connected together in a series, parallel, series-parallel, or other configuration. A PV cell string may form a PV cell module.

Maximum power point tracking as described here may be used with any converter, such as, for example, a resonant-mode converter, a voltage source converter, a current source converter, etc.

Figure 3A:
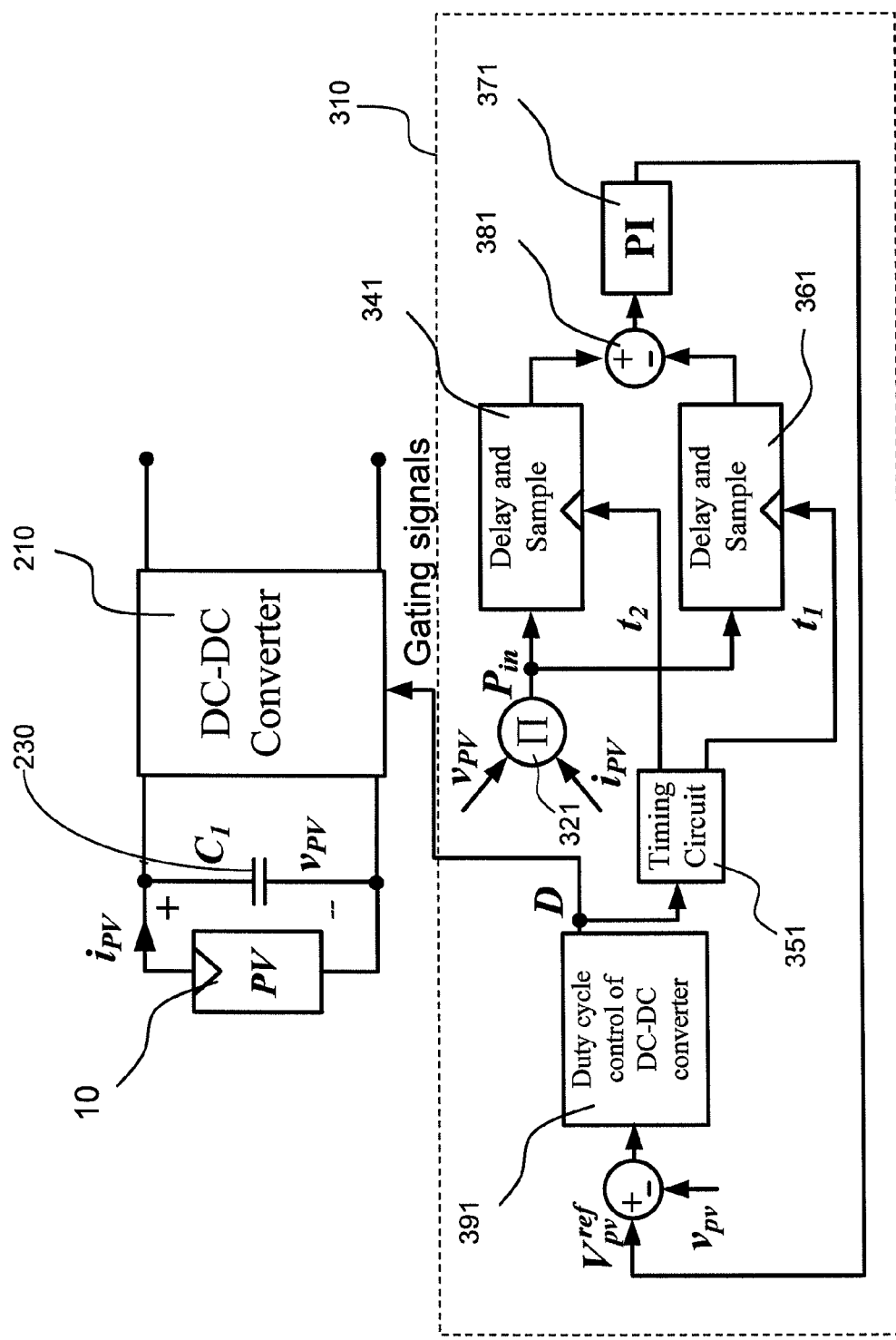
FIGS. 3(a) and (b) are diagrams of maximum power point tracking schemes according to two embodiments.
Figure 3B:
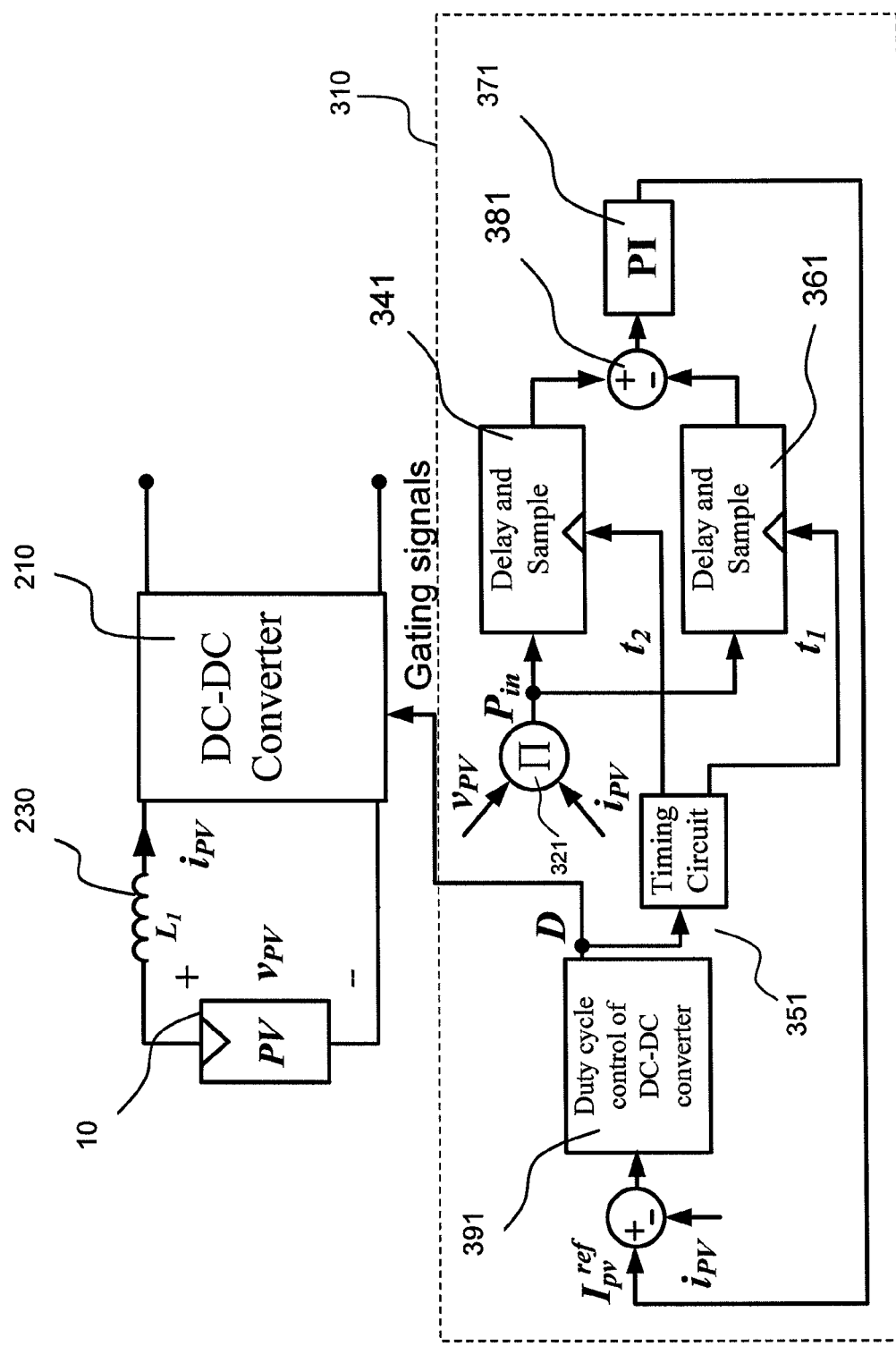

Exemplary embodiments of a MPP tracker and a MPPT scheme are shown in FIGS. 3(a) and 3(b). In the following description, the embodiment shown in FIG. 3(a) is described with reference to the exemplary waveforms at different operating points shown in FIGS. 4(a) to (d). Operation of the embodiment shown in FIG. 3(b) will be readily apparent to one or ordinary skill in the art based on the principle of operation described below.

Figure 4:
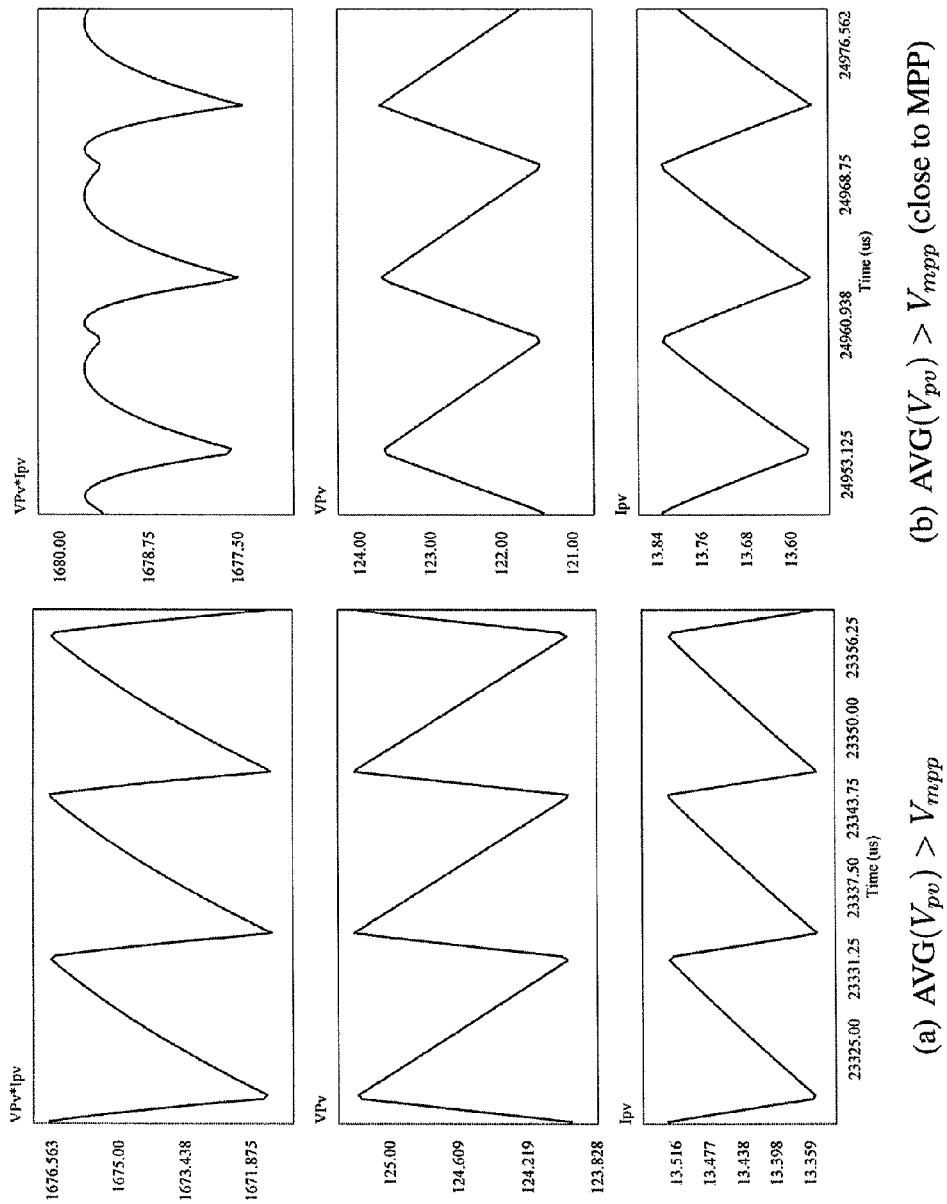
FIGS. 4(a)-(d) are plots showing PV cell waveforms for different operating points relative to the maximum power point.
Figure 4:
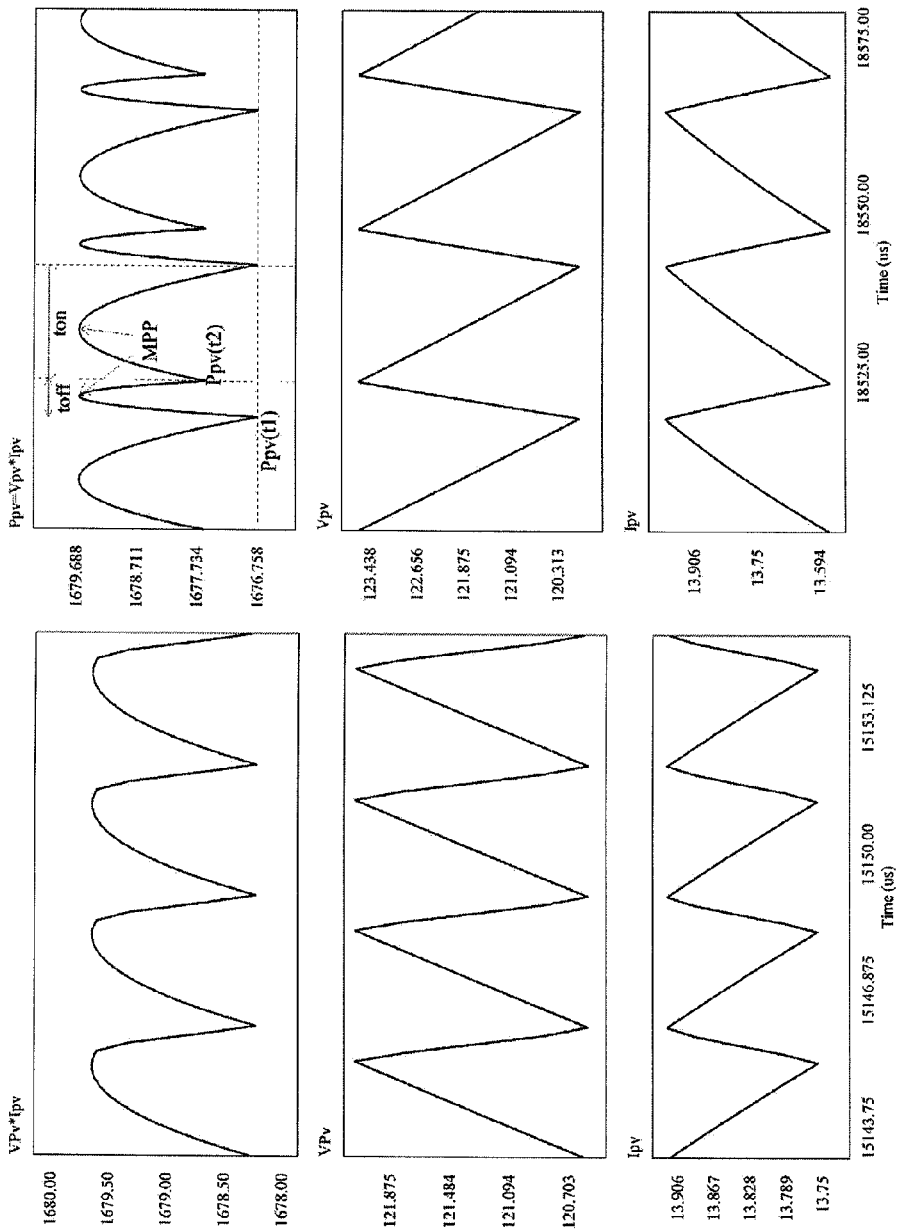

Referring to FIGS. 3(a) and 4(a) to (d), the principle of operation may be explained as follows, using a PV cell as an example of a power generator 10. In this embodiment an input capacitor $C_1$ is provided at the input of the DC-DC converter section 210. When the DC-DC converter 210 switches are in positions such that the converter does not draw power from the PV cell, the PV cell will charge the input capacitor $C_1$. As shown in FIG. 4(c), if the average PV cell voltage at the operating point is much lower than the maximum power point (MPP), the power curve has the same slope as the voltage (the opposite condition is shown in FIG. 4(a)). However, as shown in FIGS. 4(b) and (d), for the case where the PV cell voltage is increasing, the PV cell power increases and then decreases, and passes through the MPP. Therefore, as shown in FIG. 4(d), if the control strategy forces the PV cell to satisfy $P_{pv}(t_1)=P_{pv}(t_2)$, the MPP will always be tracked. Sampling of the PV cell voltage and current may be performed such that from $t_1$ to $t_2$ the voltage of the PV cell increases. Similarly for FIG. 3(b), sampling of the PV cell voltage and current may be performed such that the current of the PV cell increases from $t_1$ to $t_2$. Sampling is controlled by a timing circuit as described below.

The embodiment of the control section 310 shown in FIG. 3(a) or (b) includes closed-loop feedback control. For example, control may be implemented by a proportional-integral (PI) controller 371 as shown in the figures. As noted above, all or part of the control section may be implemented in analog and/or digital (hardware/software) platforms. For example, an algorithm in a digital implementation may include the PI controller. In the embodiment shown in FIG. 3(a) or (b) the PV cell instantaneous voltage and current are sampled, and the instantaneous power from the PV cell $P_{in}$ is determined at 321. Using two delay and sample blocks 341, 361, the instantaneous power $P_{in}$ from the PV cell is sampled at two switching instances ($t_1$ and $t_2$) where the voltage increases monotonically. The sampling times are controlled by a timing circuit 351. The difference of these two power values, ($P_{in}(t_1)$ and $P_{in}(t_2)$) is determined at 381, and gives a correct direction towards the MPP. That is, if the difference is negative, the PI controller 371 increases the set point $V_{pv}^{ref}$ to a point where the two values ($P_{pv}(t_1)$ and $P_{pv}(t_2)$) are equal, and vice versa (i.e., if the difference is positive, the PI controller 371 decreases the set point $V_{pv}^{ref}$ to a point where the two values ($P_{pv}(t_1)$ and $P_{pv}(t_2)$) are equal). The objective is to make this difference zero. A control and timing block 391 produces gating signals for the switches of the converter 210. The control and timing block 391 may also provide power decoupling. Increasing or decreasing the set point $V_{pv}^{ref}$ is performed while minimizing or avoiding any possible oscillations and within a short time interval. It will be appreciated that the method provides a very fast response time and does not use trial and error or any logical/relational operations, and thereby avoids misleading results typical of prior methods.

It is noted that the embodiments described herein permit the use of a small value of $C_1$. The resulting short charge/discharge times of the capacitor facilitate very fast maximum power point tracking.

The embodiments of FIGS. 3(a) and (b) may be used substantially as shown or with other circuitry to produce a DC output power for use with a DC load or a DC power distribution system. The embodiments of FIGS. 3(a) and (b) may also be used with further circuitry such as an inverter circuit and suitable rectifier/filter circuits (i.e., one or more of sections 220, 240, 250, and 320 of FIG. 1(b)) to produce AC output power (e.g., 50 or 60 Hz) for use with an AC load or injected into a power distribution grid.

In some cases a PV cell characteristic may have more than one maximum power point. Depending on the starting point of the algorithm, this may lead to a situation in which a power point tracking method, such as described herein, gets trapped in local maximum power points. To avoid such a situation, the method may include sweeping the voltage of the PV cell for the range of MPPs, determining a global maximum power point, and setting the starting point as close as possible to the global maximum power point. This ensures that the MPPT algorithm will always track the global maximum power point. The interval at which the voltage range of the PV cell is swept may be programmable and may depend on factors such as the PV cell/module configuration. Since the sweep can be performed very fast, and this situation normally does not happen often, the search for a global maximum power point does not affect the overall efficiency of the system. It is worth mentioning that such a condition is not specific to the method described herein; rather, any MPPT algorithm may be similarly affected.

The following non-limiting example is provided to further illustrate the invention.

Working Example

Figure 5:
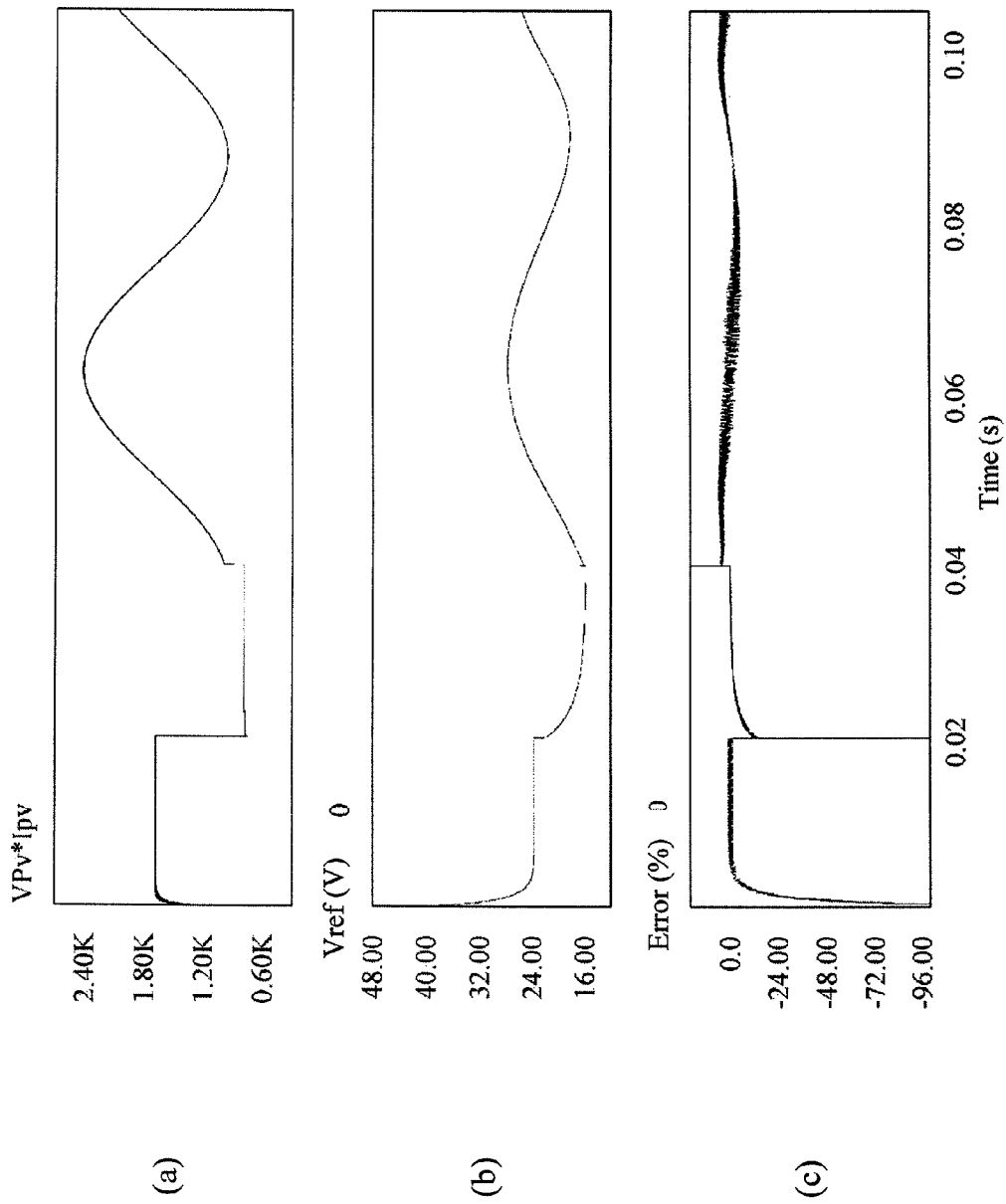
FIGS. 5(a)-(c) are plots showing results of a simulation of the embodiment of FIG. 3(a), for a step change and a sinusoidal change in the irradiation level at (a) 20 ms and (b) 40 ms, respectively, with the error signal shown in (c).

An analogue simulation of the MPP tracker and MPPT control scheme shown in FIG. 3(a) was carried out for a PV cell, using the PV cell model in PSIM™ version 9 (Powersim Inc., Woburn, Mass.). Irradiation was varied using a step change and a sinusoidal change at 20 Hz. FIG. 5(a)-(c) shows the simulation results at the different irradiation levels. From FIG. 5(c) it can be seen that for very fast changing irradiation (the step change) the error was maintained at a very low level. This improves the overall efficiency of the system.

The contents of all references cited herein are hereby expressly incorporated by reference.

Equivalents

Those skilled in the art will recognize or be able to ascertain variants of the embodiments described herein. Such variants are within the scope of the invention and are covered by the appended claims.

The invention claimed is:

1. A method of tracking a maximum power point of a power generator, comprising:
   (i) obtaining first and second power samples from a product of instantaneous output voltage and current of the power generator at a first instant in time and at a second instant in time, respectively,
   wherein the instantaneous voltage or current at a first instant in time is always greater than the instantaneous voltage or current at a second instant in time, or
   wherein the instantaneous voltage or current at a first instant in time is always less than the instantaneous voltage or current at a second instant in time;
   (ii) using a first controller to generate a reference voltage signal or a reference current signal from a difference of the first and second power samples;
   (iii) using a second controller to generate at least one gating signal for a power converter from a difference of the reference voltage signal or reference current signal and an instantaneous power generator voltage or current, the at least one gating signal being generated at a next instant in time; and (iv) repeating (i) to (iii) so as to minimize the difference of the first and second power samples;

wherein the power converter affects magnitude of the output voltage and current of the power generator; and wherein the maximum power point is tracked when the difference of the first and second power samples is minimized.

2. The method of claim 1, wherein generating a reference voltage or current signal from a difference of the first and second power samples includes using a proportional-integral (PI) controller.

3. The method of claim 1, comprising sweeping the output voltage of the power generator for a range of maximum power points, determining a global maximum power point, and setting a starting point for maximum power point tracking as close as possible to the global maximum power point.

4. The method of claim 1, wherein the power generator is a photovoltaic cell, a wind turbine, or a fuel cell.

5. The method of claim 1, wherein the power generator comprises at least one photovoltaic cell.

6. A maximum power point tracker for a power generator, comprising:
  (i) a sampling circuit that provides first and second power samples from a product of instantaneous output voltage and current of the power generator at a first instant in time and at a second instant in time, respectively, wherein the instantaneous voltage or current at a first instant in time is always greater than the instantaneous voltage or current at a second instant in time, or wherein the instantaneous voltage or current at a first instant in time is always less than the instantaneous voltage or current at a second instant in time;
  (ii) a first controller that generates a reference voltage signal or a reference current signal from a difference of the first and second power sample; and
  (iii) a second controller that generates at least one gating signal for a power converter from a difference of the reference voltage signal or reference current signal and an instantaneous power generator voltage or current, the at least one gating signal being generated at a next instant in time;

wherein the power converter affects magnitude of the output voltage and current of the power generator; and wherein the maximum power point is tracked when the difference of the first and second power samples is minimized.

7. The maximum power point tracker of claim 6, wherein the first controller that generates the reference voltage or current signal comprises a proportional-integral (PI) controller.

8. The maximum power point tracker of claim 6, comprising a circuit that sweeps the output voltage of the power generator for a range of maximum power points, determines a global maximum power point, and sets a starting point for maximum power point tracking as close as possible to the global maximum power point.

9. The maximum power point tracker of claim 6, wherein the power generator is a photovoltaic cell, a wind turbine, or a fuel cell.

10. The maximum power point tracker of claim 6, wherein the power generator comprises at least one photovoltaic cell.

11. A micro-inverter for a power generator, comprising:
  the maximum power point tracker of claim 6; and
  a power converter.

12. The micro-inverter of claim 11, wherein the power converter comprises a DC-DC converter and a DC-AC inverter.

13. The micro-inverter of claim 11, wherein the power converter generates a sinusoidal output current from the power generator output.

14. The micro-inverter of claim 11, wherein the power generator is a photovoltaic cell, a wind turbine, or a fuel cell.

15. The micro-inverter of claim 11, wherein the power generator comprises at least one photovoltaic cell.

16. A power generation system, comprising:
  the micro-inverter of claim 11; and
  at least one power generator.

17. The system of claim 16, wherein the power generator is a photovoltaic cell, a wind turbine, or a fuel cell.

18. The system of claim 16, wherein the power generator comprises at least one photovoltaic cell.

* * * * *